Aug. 14, 1956  L. B. SCOTT ET AL  2,758,502
MEANS FOR OSCILLATING A BEAM IN A PLANE
Filed Oct. 8, 1952  2 Sheets-Sheet 1

INVENTORS
Larkin B. Scott
Abe Offner
BY
Pennie Edmonds Morton, Barrows Taylor
ATTORNEYS INVENTORS
Larkin B. Scott
Abe Offner
BY
Pennie Edmonds Morton Barrows Taylor
ATTORNEYS

United States Patent Office 2,758,502
Patented Aug. 14, 1956

2,758,502

MEANS FOR OSCILLATING A BEAM IN A PLANE

Larkin B. Scott, New Canaan, and Abe Offner, Darien, Conn., assignors to The Perkin-Elmer Corporation, Norwalk, Conn., a corporation of New York Application October 8, 1952, Serial No. 313,632

9 Claims. (Cl. 88—14)

This invention relates to means for causing a beam of radiation to oscillate in a plane and is concerned more particularly with a novel combination of elements for the purpose, which does not include an element having an oscillating movement. The new assembly may be employed in various applications and, when appropriately modified, with radiation of various kinds, it can be operated by a simple driving means of low power and functions without objectionable vibration. All the advantages of the invention are realized in a monochromator, in which the new assembly is employed to cause the spectrum to travel relatively to the exit slit and detector with an oscillating movement, during which the spectrum is scanned by the detector alternately in opposite directions, and such a monochromator may be employed in a spectrometer for use in absorption spectrometry. A spectrometer provided with the new assembly will, accordingly, be illustrated and described for purposes of explanation, but it is to be understood that the utility of the invention is not limited to this specific instrument and other uses, to which the assembly may be put, will be pointed out hereafter.

In rapid scanning spectrometers of the type containing a Littrow mirror for receiving the dispersed radiation from the prism and returning it to the prism for a second dispersion, the desired scanning action has heretofore been accomplished by vibrating or oscillating the Littrow mirror about an axis parallel to the refracting edge of the prism. As the Littrow mirror and its mounting are heavy, it has been difficult to provide a satisfactory driving means for oscillating the mirror and mount at the desired high frequency and amplitude. Moreover the driving means for such a Littrow mount are often bulky and as a consequence consume considerable power. Also, if vibration is to be avoided, complicated balancing means are required.

The assembly of the invention provides a simple, highly effective means for causing a beam of radiation to oscillate in a plane and, when employed in a rapid scanning spectrometer to produce the scanning action, the assembly is devoid of the objectionable features of a vibrating Littrow mirror and the driving means therefor. The assembly comprises only three elements, one of which is a nutating mirror, that is, a plane mirror mounted for angular movement about an axis, which makes a small angle with the normal to the mirror surface. The second element of the assembly is a reflector, which receives a beam from the nutating mirror and returns it to the mirror for reflection thereby, the reflector functioning in such manner that the beam finally leaving the mirror undergoes no angular deviation in one plane, rather being linearly displaced in a manner to be described more fully hereinafter. The third element is a collimator positioned in the path of the emergent beam to eliminate the linear displacement of the beam so that it has an oscillatory motion due solely to angular deviation in a single plane. In its simplest form, the reflector is a roof mirror, that is, a pair of plane mirrors mounted with the planes of their faces lying at right angles to each other. When the assembly includes such a roof mirror, the scanning effect is obtained by rotating the nutating mirror at the desired rate and, since the nutating mirror can be accurately balanced and is light in weight, it can be rotated without significant vibration by a small electric motor. In an alternative construction, the roof mirror is replaced by a second nutating mirror rotated in proper relation to the first. The third element of the assembly is a collimator, which may consist of a collimating lens or a collimating reflective element such as a parabolic mirror, depending upon the type of radiation transmitted in the beam being operated upon.

For a better understanding of the invention, reference may be made to the accompanying drawings, in which Fig. 1 is a diagrammatic plan view of a spectrometer embodying the invention;

Figure 1:
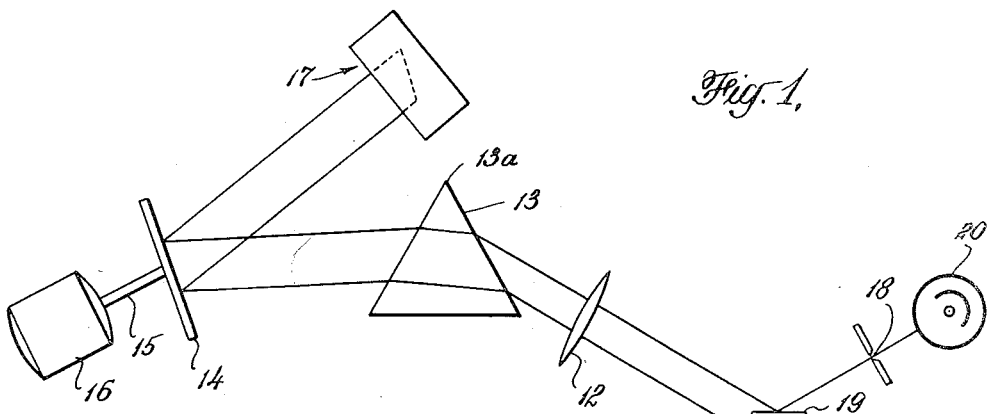

The spectrometer shown in Fig. 1 includes a source S of radiation and an optical element 10, which focuses radiation from the source upon an entrance slit 11. The source S may be any of the conventional sources of the radiation to be employed in the instrument and the optical element 10 is appropriate for such radiation. In the instrument shown, visible radiation is employed and the element 10 is a lens, whereas, in an instrument utilizing infrared radiation, the focusing element is ordinarily a suitable mirror.

The radiation entering through slit 11 is collimated by an optical element 12, which is illustrated as a lens, and the collimated radiation passes to a dispersing element, such as prism 13 mounted with its refracting edge 13a substantially parallel to the long dimension of slit 11. The dispersed beam leaving the prism falls upon a nutating element 14, which is illustrated as a plane mirror so mounted on the shaft 15 of a motor 16 that the normal to the surface of the mirror makes a small angle with its axis of rotation. The radiation, when initally reflected by the nutating mirror, is therefore angularly deviated in two perpendicular planes and describes a conical pattern which travels to a reflector 17. In the instrument shown, reflector 17 is a roof or corner mirror made up of a pair of plane mirrors 17a, 17b lying with their planes at right angles to each other and having an edge 17c in common. The edge 17c lies in the plane in which it is desired that the oscillation of the beam be achieved. In this illustrative instance that plane is at right angles to the refracting edge 13a of the prism 13.

The dispersed beam reflected by the nutating mirror falls upon one component of the roof mirror, is reflected thereby upon the other component, and is then reflected back to the nutating mirror. From the latter, the radiation passes to the prism for a second dispension and the twice-dispersed beam travels to the optical element 12, which focuses it upon an exit slit 18, the beam being turned on its way to the slit by a diagonal plane mirror 19. The exit slit lies with its long dimension substantially parallel to that of the entrance slit and the radiation issuing through the exit slit falls upon a suitable detector 20, the response of which to the radiation may be utilized in the usual manner. A cell 21 for a sample to be examined may be disposed in the instrument in any of the usual places, as, for example, between optical element 10 and entrance slit 11.

In the operation of the instrument, the nutating mirror 14 is rotated by motor 16 at the desired rate and the mirror 14 and the roof mirror 17 cooperate to cause the spectrum falling upon the exit slit to travel back and forth across the slit, so that the spectrum is scanned through a wavelength interval, which depends on and varies directly with the angle between the normal to the reflecting surface of mirror 14 and its axis of rotation. The central wavelength in the interval being scanned can be varied by rotating the nutating mirror motor 16 or the roof mirror 17 about axes normal to the plane of the instrument, such axes being vertical in the instrument illustrated.

Figure 2:
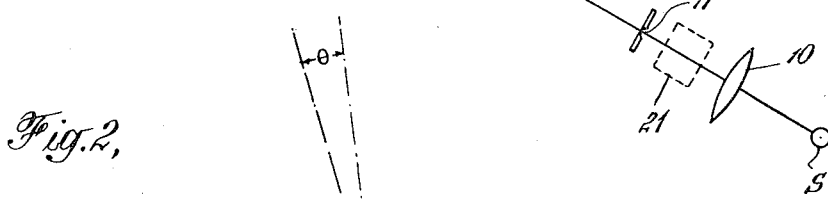
Figs. 2 and 3 are diagrammatic views showing the action of the roof mirror.
Figure 3:
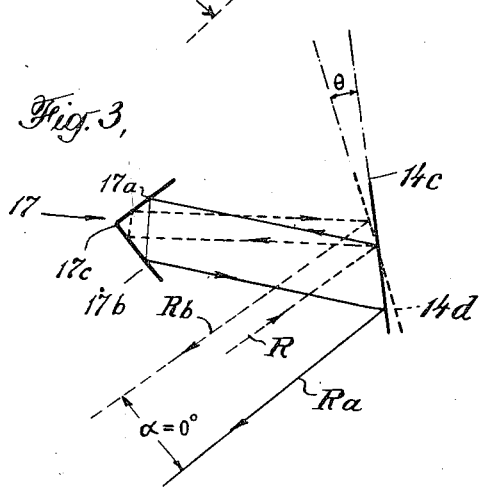

The manner, in which the nutating mirror 14 and the roof mirror 17 cooperate to permit the spectrum to be scanned, as described, will be readily apparent from Figs. 2 and 3. In Fig. 2, the solid line 14a represents the plane of the mirror in one position and the dotted line 14b represents the plane of the mirror after it has been rotated on its axis through 180° from position 14a. The two positions of the plane of the mirror are such that the lines 14a, 14b define the greatest angle between them in a horizontal plane containing the line of intersection 17c of the planes of the components of the roof mirror. The angle $\theta$ is twice the angle of tilt of the mirror, that is, the angle made by the normal to the mirror surface with the axis of rotation of the mirror. A ray from the prism striking the mirror 14 is indicated at R and it will be observed that, when the plane of mirror 14 lies at 14a, the ray R, after traveling from mirror 14 to the corner mirror 17 and there undergoing a double reflection, returns to mirror 14 and emerges along the line Ra. When the plane of mirror 14 lies at 14b, the emergent ray is indicated at Rb and the angle between rays Ra and Rb projected upon the horizontal plane containing the line of intersection 17c of the components of the roof mirror is $4\theta$. The incoming ray R is, accordingly, deviated through an angle $4\theta$ in the horizontal plane referred to during an angular travel of the nutating mirror through 180°.

In Fig. 3, the plane of the nutating mirror is shown in positions 14c, 14d, which are removed angularly 90° in the same direction from positions 14a, 14b, respectively. The lines 14c, 14d represent the maximum angle $\theta$ which the nutating mirror makes in a plane at right angles to the line of intersection 17c of the planes of the components 17a and 17b of the roof mirror 17.

Assuming that the nutating mirror is in a position 14c, the ray R is reflected to the roof mirror 17 as shown by the solid lines of Fig. 3 and along a return path to the nutating mirror 14 whence it is reflected again and emerges as Ra. It is to be noted that the return path of the ray from the roof mirror 17 has a projection in the horizontal plane which is parallel to the comparable projection of the outgoing ray immediately following its initial reflection from the nutating mirror 14. Similarly, the emergent ray Ra has a projection in the horizontal plane which is parallel to the entrant ray R.

When the nutating mirror 14 is in position 14d, the outgoing initial reflection of ray R from the nutating mirror follows a path which is angularly deviated from that previously described. This angular deviation may be readily seen by comparing the solid and dotted lines of Fig. 3 which define the angular change of the ray due to the nutation of the mirror 14 from position 14c to 14d. The angular deviation of the ray R in the horizontal plane is ultimately cancelled, however, through the unique coaction of the combination of apparatus utilized in the present invention by which the second reflection of the ray R from the nutating mirror produces an emergent ray Rb having no angular deviation from Ra in the horizontal plane regardless of the initial angular deviation due to nutation of the mirror. This result is best illustrated in Fig. 3 where the emergent rays Ra and Rb, though linearly displaced, are seen to have no angular deviation in the plane of the illustration either from each other or from the entrant ray R, though their respective initial reflections from the nutating mirror 14 are effected at the extremes of the nutating angle included between 14c and 14d.

The linear displacement of Ra from Rb is eliminated by a collimating element such as the lens 12 shown in Fig. 1 and the pattern described by the beam then consists entirely of oscillatory angular deviation in a single plane.

As will be apparent from Figs. 2 and 3, a ray striking the nutating mirror 14 and reflected thereby defines a cone as the mirror rotates, so that the ray may be regarded as being deflected in planes at right angles to each other. The roof mirror returns the ray along a return path and the projection of the return path on one of the planes is parallel to the projection of the outward path of the beam on that plane, while the projection of the return path on the second plane lies at an angle to the projection of the outward path of the beam on the second plane. The ray is, accordingly, returned by the roof mirror to the nutating element, with deflection in a single plane only and that plane lies perpendicular to the refracting edge of the prism and contains the line of intersection 17c of the components of the roof mirror. As a result of the action of the nutating mirror, the roof mirrors, and the collimating element, the spectrum travels back and forth across the exit slit, as the nutating mirror rotates, and without angular deviation in a direction parallel to the long dimension of the slit. The rate, at which the spectrum is scanned, depends on the rate of rotation of the nutating mirror, each complete rotation resulting in a movement of the spectrum relative to the exit slit first in one direction and then in the other.

Figure 4:
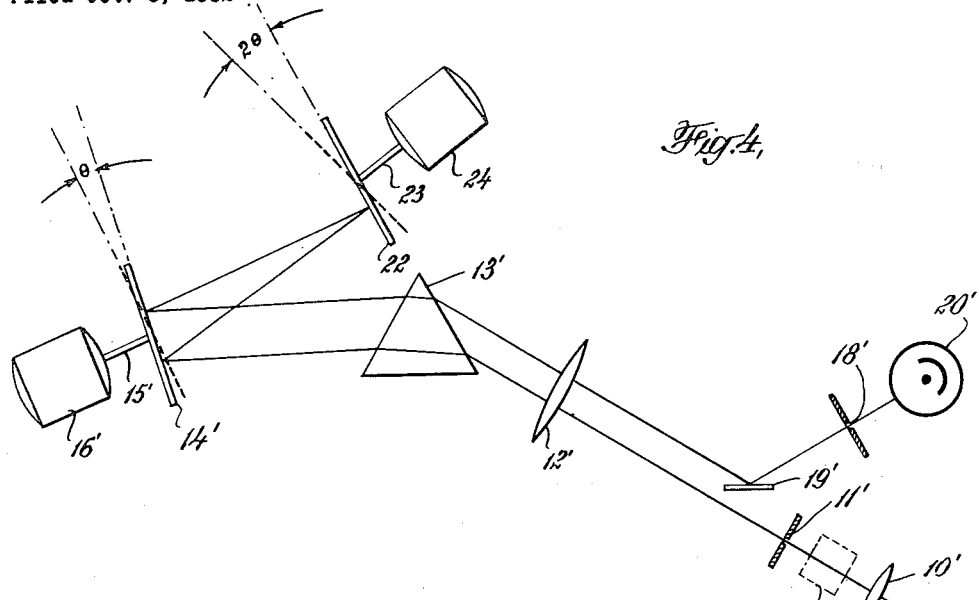
Fig. 4 is a view similar to Fig. 1 of a modified construction.
Figure 5:
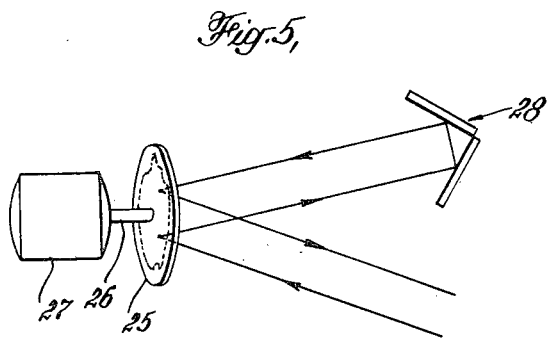
Fig. 5 is a diagrammatic view of another embodiment of the invention.

While the combination of a nutating mirror, a roof mirror, and a collimator, provides a simple, effective means for producing the movement of the spectrum for scanning purposes, the same results are obtainable by the use of the modified form of the apparatus shown in Fig. 4. The instrument of Fig. 4 includes a source S', a focusing lens 10', a collimating lens 12', a prism or other dispersing element 13', and a nutating mirror 14' mounted on the shaft 15' of a motor 16'. The dispersed beam from the prism falling upon mirror 14' is reflected to a second nutating mirror 22 mounted on the shaft 23 of a motor 24 and is reflected back to the mirror 14'. From mirror 14', the beam travels to the prism for a second dispersion and the twice-dispersed beam is then focused by lens 12' upon the exit slit 18', being turned in its travel to that slit by the diagonal mirror 19'. The radiation issuing through the exit slit falls upon detector 20'.

The second nutating mirror 22, if properly constructed and operated, functions in the same manner as the roof mirror 17, in that it coacts with the first nutating mirror 14' to return the radiation received therefrom so that upon its second reflection from the first nutating mirror, the radiation is angularly deviated in a single plane only regardless of the multiple angular deviation due to its initial reflection from the first nutating mirror. In order that it may operate as described, the mirror 22 must fulfill certain requirements as follows. The angle of tilt of mirror 22, that is, the angle between a normal to the surface of the mirror and its axis of rotation, must be twice the angle of tilt of mirror 14'. The two mirrors must rotate at the same angular rate and their directions of rotation must be opposite. Finally, the cyclic rotation of mirror 22 must be so phased with respect to that of mirror 14' that, as the normal to mirror 14' approaches the horizontal plane from one side, the normal to the mirror 22 approaches the horizontal plane from the opposite side and both normals lie in the plane at the same instant.

In the spectrometers shown in the drawings and above described, the spectrum is scanned first in one direction and then in the other and the beam returns from the first nutating mirror (mirror 14, Fig. 1) and passes through the prism for a second dispersion. In some instruments, it may be desirable to scan the spectrum in one direction only and this can be accomplished by making the first nutating mirror semi-circular in form. Also, if it is desired to return the beam from the first nutating mirror along a path different from that along which the beam from the prism reaches the mirror, this can be accomplished by swinging the roof mirror about an axis normal to a horizontal plane containing the line of intersection 17c of the components of the roof mirror, or by swinging the axis of rotation of mirror 22 about a vertical axis. When these changes are made, it is necessary to increase the diameter of the first nutating mirror, or else to replace this mirror by two mirrors rotating in phase and lying with their axes parallel and offset in a horizontal plane.

The assembly made up of the nutating mirror and either a roof mirror or a second nutating mirror together with a collimating device may be employed to advantage in monochromators, in which a wavelength interval of the spectrum is scanned, but rapid scan operation is not desired. Such monochromators ordinarily employ a Littrow mirror and the scanning action is effected by rotating the Littrow mirror mount about an axis generally parallel to the plane of the Littrow mirror and the refracting edge of the prism. When the assembly of optical elements of the invention is employed instead of a Littrow mirror in such a monochromator, the angle of tilt of the first nutating mirror may be so chosen that a large angular movement of the mirror aproximating half a revolution may be required to scan a particular wavelength interval. With such an arrangement, the use of the assembly affords a mechanical advantage, which increases as the wavelength interval to be scanned becomes smaller. The driving means for the nutating mirror in an assembly for the specified use may, accordingly, be less accurate than that employed for rotating a Littrow mount for similar scanning purposes.

Figure 6:
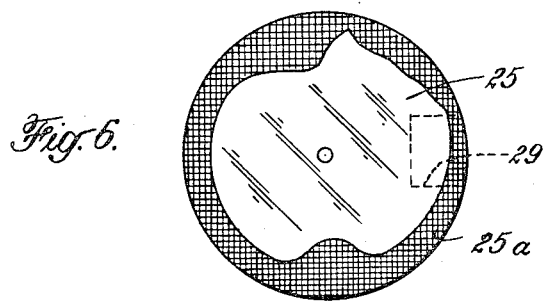
Fig. 6 is a view in elevation of an element employed in the combniation shown in Fig. 5.

The new assembly may be employed to vary the optical transmission of a monochromator as a function of wavelength, and, for this purpose, the nutating mirror, such as mirror 14 in the assembly of Fig. 1, is provided with a non-reflecting mask preferably disposed along the periphery of the mirror. Mirror 25 (Fig. 6) is shown as provided with such a mask 25a and the mirror with the mask is mounted on the shaft 26 of a motor 27 and passes the beam received from the prism to a roof mirror 28 or a second nutating mirror, such as mirror 22, which returns the beam to mirror 25. The mirror 25 is so mounted in relation to the prism that only a small aperture of the mirror adjacent its edge and overlapping mask 25a as indicated by the rectangular area at 29 is in use at any instant and, as the mirror is rotated, the area of the reflecting portion of the mirror aperture varies with the wavelength of the light passing through the exit slit and falling upon the detector. By the use of a mask of appropriate shape in the proper angular position on the mirror, the optical transmission of the monochromator may be varied to compensate for variations in the sensitivity of the detector in response to light of different wavelengths. The effect of having a detector, which has an overall flat response independent of wavelength, is thus achieved.

We claim:

1. Apparatus for oscillating a beam of radiation in a single plane comprising a nutating reflective element positioned in the path of said beam for deflecting the beam in a cyclic pattern of variable angular deviation in two perpendicular planes, reflecting means positioned to receive said deflected beam and return it to said nutating reflective element, the projection of the return path on said single plane lying at an angle to the projection of the outward path of the beam on said single plane and said paths having parallel projections on a plane perpendicular to said single plane, dispersing means positioned in the path of said beam of radiation for dispersing said beam both before it strikes said nutating element and after it has been twice reflected thereby, and collimating means positioned to intercept the emergent beam, whereby to correct any linear displacement of said beam without changing its oscillatory angular deviation in said single plane.

2. Apparatus as defined in claim 1 including an exit slit upon which the twice-dispersed beam is focused by the collimating element.

3. Apparatus as defined in claim 2 in which the dispersing means is a prism disposed with its refracting edge parallel to the long axis of the exit slit and the reflecting means is a roof mirror made up of a pair of plane mirrors perpendicularly disposed to each other and with the line of intersection of their surfaces at right angles to the refracting edge of the prism.

4. Apparatus as defined in claim 1 in which the nutating element includes means for varying the amount of radiation reflected thereby as a function of its rotational disposition.

5. Apparatus for oscillating a beam of radiation in a single plane comprising a nutating reflective element positioned in the path of said beam for deflecting the beam in a cyclic pattern of variable angular deviation in two perpendicular planes, reflecting means positioned to receive said deflected beam and return it to said nutating reflective element, the projection of the return path on said single plane lying at an angle to the projection of the outward path of the beam on said single plane and said paths having parallel projections on a plane perpendicular to said single plane, and collimating means positioned to intercept the emergent beam, whereby to correct any linear displacement of said beam without changing its oscillatory angular deviation in said single plane.

6. Apparatus as defined in claim 5 in which the reflecting means is a roof reflector comprising a pair of mirrors perpendicular to each other and having an intersection lying in one of the planes of angular deviation.

7. Apparatus as defined in claim 5 in which the nutating element is a plane mirror mounted to rotate about an axis angularly disposed relative to the perpendicular to said plane mirror.

8. Apparatus as defined in claim 5 in which the reflecting means comprises a second nutating element and means for rotating the second nutating element at the same angular rate as the first and in the opposite direction.

9. Apparatus as defined in claim 8 in which both nutating elements are plane mirrors each mounted to rotate about an axis angularly disposed relative to the perpendicular to its respective plane.

References Cited in the file of this patent

UNITED STATES PATENTS

| Number | Name | Date |
|---|---|---|
| 1,746,525 | Darrah | Feb. 11, 1930 |
| 2,330,877 | Fleisher et al. | Oct. 5, 1943 |
| 2,336,550 | Kruper | Dec. 14, 1943 |
| 2,393,631 | Harrison et al. | Jan. 29, 1946 |
| 2,437,323 | Heigl et al. | Mar. 9, 1948 |
| 2,571,937 | Peck | Oct. 16, 1951 |
| 2,652,742 | Walsh | Sept. 22, 1953 |